Nov. 14, 1972 MORIO TAKEICHI ET AL 3,702,726
MOTION-PICTURE PROJECTOR FOR A FILM CONTAINED IN A CARTRIDGE
Filed Oct. 6, 1970 5 Sheets-Sheet 1

MORIO TAKEICHI and
KAZUHIKO OGURA, INVENTORS

BY Wenderoth, Lind & Ponack
ATTORNEYS

United States Patent Office 3,702,726
Patented Nov. 14, 1972

3,702,726
MOTION-PICTURE PROJECTOR FOR A FILM
CONTAINED IN A CARTRIDGE
Morio Takeichi, Inazawa, and Kazuhiko Ogura, Nagoya, Japan, assignors to Elmo Company Limited, Mizuho-ku, Nagoya, Aichi Prefecture, Japan
Filed Oct. 6, 1970, Ser. No. 78,459
Int. Cl. G03b 23/02
U.S. Cl. 352—72                                    7 Claims

ABSTRACT OF THE DISCLOSURE

A film cartridge comprises a film supply reel on which a roll of film can be wound with its trailing end secured thereto, a support for carrying said supply reel in a rotatable manner, and a film take-up core to which a leading end of the film roll can be secured. A motion-picture projector for a film contained in a cartridge. A film take-up core is disengaged from a support forming part of the cartridge and the take-up core together with the leading end of the film can pass through the film gate until it reaches a position where it can be rotated by a driving means for film winding, whereby the film can be threaded through its predetermined path.

BACKGROUND OF THE INVENTION

This invention relates to a motion-picture projector for projecting a roll of motion picture film contained in a cartridge in which the ends of the film are secured to a film take-up core and a film supply reel respectively.

Heretofore, various attempts to employ a cartridge, in which a film to be projected is contained, have been made, in order to simplify operations needed for the projection of the film and to provide convenience for the custody of the film, and actually some types of motion-picture projectors and cartridge therefor have been commercially provided.

For example, one type of a hitherto known projection system employs a so-called endless loop film cartridge in which an endless film is contained. The cartridge of the type described above is advantageously characterized by the fact that there is no need to rewind the film in effecting the projection. However, it requires special technique and additional time to form a length of a film with leading and trailing ends to be connected together into a roll of film and to accommodate this formed film roll in the cartridge. Because of the necessity of such troublesome preparatory proceedings, this type of projection system has limited uses and is applied to only the field of movies for educational training.

Another type of a projection system employs a cartridge of the type comprising a film take-up hub having the leading end of a film secured thereto, a film supply hub having the trailing end of the film secured thereto and arranged a predetermined distance apart from the film take-up hub, and a notch or opening provided between the take-up and supply hubs, which opening allows a part of the illuminating optical system to enter therein. With such type of the projection system, to accommodate the film in the cartridge is easy and there is an advantage that the film roll wound on a film reel may be placed in the cartridge just as it is, as the case may be depending upon the construction of the cartridge. However, with the cartridge employed in this projection system, since the positions of and the distance between the film supply and take-up hubs remains unchanged, as an inevitable consequence the film path through the projector is fixed. In addition, the light emanating from the illuminating optical system employed in the projector can not directly impinge upon the back of the film, i.e., the illumination by direct light can not be achieved, resulting in the disadvantage that the projection is inevitably carried out at a reduced illuminating efficiency.

In order to overcome these disadvantages of the first and second projection systems, a third type of a projection system employing a cartridge capable of containing a roll of film wound on an ordinary film reel has been proposed. In this system, after installing the cartridge in the associated projector, the film roll is driven or rotated by a driving member such as an endless belt or a friction roller while at the same time the outermost peripheral portion of the film roll engages a spatula-shaped tip of a film taking-out member, thereby causing the leading end of the film to be taken out of the cartridge and guided to an entrance to a film track in the projector.

In such a third projection system, to install the film in the cartridge is easy and to directly illuminate the film is possible. However, a special arrangement is required to take the film out of the cartridge and, in addition, it is required to effect a troublesome operation in which, after installing the film in the projector, the film taking-out member must be retracted out of engagement with the film roll. Further, due to the direct engagement of the film taking-out member with the surface of the film roll, the leading end portion of the film is apt to be damaged by friction. Therefore, it is necessary to equip the leading end portion with a leader belt of a suitable rigidity and a sufficient length to prevent the film or the pictures on the film from being damaged. However, there is still a disadvantage that as the leader belt itself has a tendency to curl, it might happen that the leading end of the film is not correctly taken out of the cartridge. Thus, the third projection system lacks reliability.

SUMMARY OF THE INVENTION

It is therefore an object of the invention to provide a motion-picture projector employing a roll of motion-picture film contained in a cartridge and to avoid the aforementioned disadvantages of the prior art projectors.

The above object of the invention can be attained by employing a film cartridge of the type comprising a film supply reel on which a roll of film is wound with its trailing end secured thereto, a support means for carrying said reel in a rotatable manner, and a film take-up core to which a leading end of the film roll can be secured, said core being detachably connected with said support means. When using such a cartridge, the film threading can be accomplished by a method which comprises, after mounting in a projector the cartridge containing the film roll wound on the film supply reel, disengaging the film take-up core from the support means, and moving the film take-up core through a film gate of the projector together with the leading end of the film, then to a position where the take-up core engages a driving means for film winding.

In addition, a motiion-picture projector of the invention is so constructed as to be adapted for the employment of the abovementioned film threading method and the cartridge, and comprises means for holding the said cartridge, said holding means being provided with a member for breaking the engagement of the take-up core with the support for driving the film roll, for bringing the take-up core means into driving engagement with the driving means, and means for opening a film gate a distance at least sufficient to permit the take-up core to pass through the film gate, said film gate being closed when the leading end of the film, after passing through the film gate, is brought into engagement with the driving means, whereby the film can be threaded through its predetermined path in the projector.

BRIEF DESCRIPTION OF THE DRAWINGS

The objects and advantages of the invention will be more apparent from the following detailed description taken in conjunction with the accompanying drawings in which:

FIGS. 10b, 11b and 12b are views each corresponding to that of FIG. 8, showing the modified cartridges of FIGS. 10a, 11a and 12a;

DESCRIPTION OF THE PREFERRED EMBODIMENTS

Figures 1, 2, 3, 4, 5, 6, 7, 8:
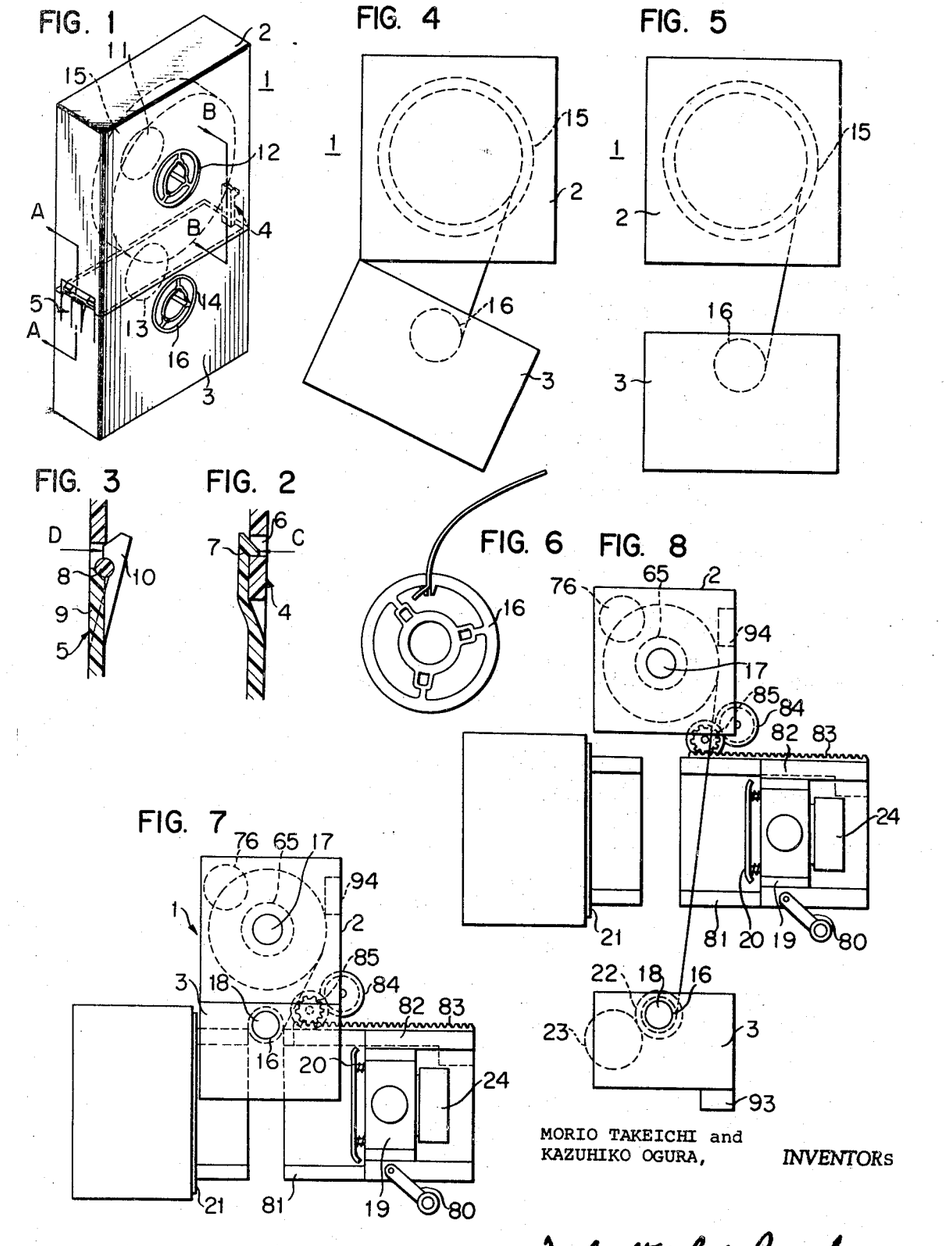
FIG. 1 is a perspective view of a film cartridge constructed in accordance with the teachings of the invention.
FIGS. 2 and 3 are fragmental detail sections having respectively connecting means for detachably connecting the unit with the detachable unit of the cartridge of FIG. 1.
FIGS. 4 and 5 are schematic views of the cartridge for explaining the disengagement of one unit from the other.
FIG. 6 is a view illustrating a connection of the leading end or trailing end of a film with a film reel.
FIGS. 7-9 are views illustrating the successive steps of loading a motion-picture projector with the cartridge of FIG. 1.

Referring to the drawings and FIG. 1 in particular, there is shown a film cartridge 1 constructed in accordance with the teachings of the invention, which is divided into two units, i.e., a support unit 2 and a detachable unit 3. These two units 2 and 3, when out of use, can be connected together into a single unit by connecting means 4 and 5 provided in the opposite sides of the cartridge 1. Preferably, the cartridge 1 is moulded from suitable synthetic resin having elasticity and each of the connecting means 4 and 5 is an integral part of the cartridge 1. Therefore, the support unit 2 can be held in engagement with the detachable unit 3 by the resilience of the connecting means 4 and 5 when the latter are in engagement.

As shown in FIG. 2, the connecting means 4 comprises a notch 6 provided in one of the side walls of the support unit 2, and a hook member 7 extending upwardly from the detachable unit 3. In the event that the hook member 7 is biased in a direction indicated by an arrow C against its resilience in a manner hereinafter described, the tip of the hook member 7 is moved out of engagement with the notch 6.

As shown in FIG. 3, the connecting means 5 comprises a cylindrical member 8 spannnig a notch provided in the support unit 2, a bearing means 9 receiving the cylindrical member 8, and a hook member 10 extending upwardly from the detachable unit 3. It is of course possible that the cylindrical member 8 be an integral part of the support unit 2 and each of the bearing means 9 and the hook member 10 also be an integral part of the detachable unit 3.

As shown in FIG. 4, when the connecting means 4 is out of engagement or inoperative, the detachable unit 3 can open about the cylindrical member 8 relative to the support unit 2. In such an open condition of the cartridge 1, it can be loaded with a motion-picture film to be projected on the screen.

Referring back to FIG. 3, like the connecting means 4, in the event that the hook member 10 is biased in a direction indicated by an arrow D against its resilience, the tip of the hook member 10 is brought out of engagement with the cylindrical member 8, and the support and detachable units 2 and 3 can be completely separated from each other as shown in FIG. 5.

Referring back to FIG. 1, the support and the detachable units 2 and 3 have openings 11 and 12, 13 and 14 in the opposite side walls thereof respectively, into which corresponding spindles (not shown in FIG. 1) of the motion-picture projector are inserted. The support unit 2 has contained therein a film roll wound on a rotatable supply reel 15 and the detachable unit 3 has disposed therein a rotable film take-up core 16. The leading end and trailing end of the film are secured respectively to the core 16 and the reel 15 in a suitable conventional manner such as shown in FIG. 6, wherein the leading end of the film is fixedly connected to the take-up core 16 by a clawed protrusion. In addition, the detachable unit 3 of the cartridge 1 includes a housing defining an interior and having rotatably mounted therein the take-up core 16 upon which the film supplied from the supply reel 15 in the support unit 2 is wound.

Figure 9:
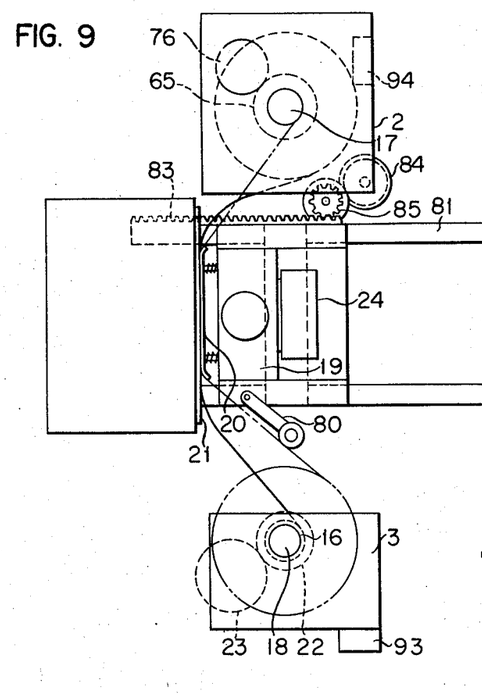

A method of threading film through a film track of the projector of the type employing the cartridge 1 shown in FIG. 1 will be described in conjunction with FIGS. 7-9.

Figure 10A:
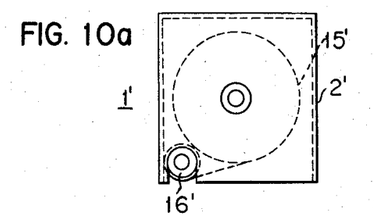
FIGS. 10a, 11a and 12a are schematic views illustrating modified forms of the film cartridge.
Figure 10B:
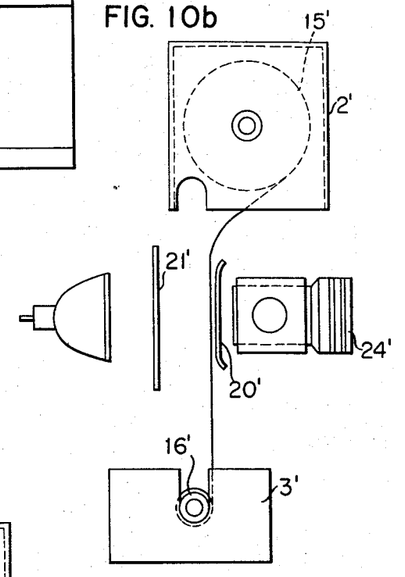

First, the cartridge 1 having the support unit 2 and detachable unit 3 assembled together is disposed in place in the projector as shown in FIG. 7. The projector is provided with a pair of film supply and take-up spindles 17 and 18 spaced a predetermined distance apart and each spindle can fit into the corresponding core of the cartridge 1, the spindle 17 being adapted to receive the supply reel 15 and the spindle 18 receiving the take-up core 16. The projector further comprises a projection lens 24, a holder 19 for the projection lens 24, a pressure plate 20 and an aperture plate 21', with the result that the projection lens 24, the holder 19 and the pressure plate 20 are moved to forwardly projecting positions by a driving mechanism as will be hereinafter described to allow the detachable unit 3 including the core 16 to be transferred downwardly through the spacing between the pressure plate 20 and the aperture plate 21 until it reaches a predetermined position in which a friction roller member 22 (see FIG. 8) integrally mounted on the take-up spindle 18 is caused to be driven through a mating friction roller member 23 which is, in turn, driven by a driving system of the projector as will be hereinafter described. After the completion of such passage of the film leading end through the space between the pressure plate 20 and the aperture plate 21, the projection lens holder 19 carrying the pressure plate 20 starts to move leftwards to close the film gate and reaches a normal projection position shown in FIG. 9.

Where the cartridge 1 of the type described above is employed, it is necessary to move the detachable unit 3 of considerable width through the aforementioned space and accordingly, when threading the film, the projection lens 24 is required to be moved forwardly a distance at least corresponding to the width of the detachable unit 3, resulting in a larger size of the projector. Therefore, when it is desired to decrease the travel of the projection lens 24 as much as possible, a cartridge 1' shown in FIGS. 10a, 10b is effective. The cartridge 1' comprises a support unit 2' carrying for rotation a supply reel 15' and a take-up core 16' disposed in the support unit 2' in such a manner as to allow an engagement and disengagement of the take-up core 16' with and from the support unit 2'. In this arrangement, the take-up core 16' alone passes through the space between a pressure plate 20' and an aperture plate 21', with the result that the projection lens 24' is required to move a smaller distance. Instead of the detachable unit 3 of the cartridge 1, the projector is preferably provided with a pair of parallel guide plates 3' which serves to restrict a lateral movement of the film being wound on the core 16' within the spacing therebetween, whereby even though the film roll wound on the core 16' increases in diameter it can be prevented from being getting loose.

Figure 11A:
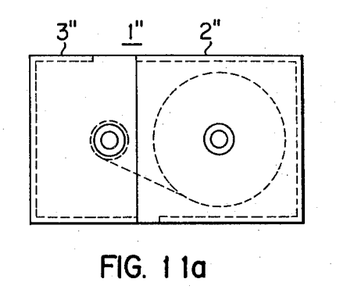
Figure 11B:
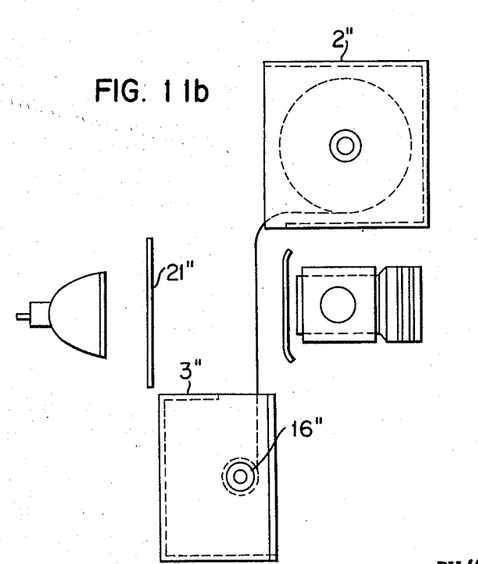
Figure 12A:
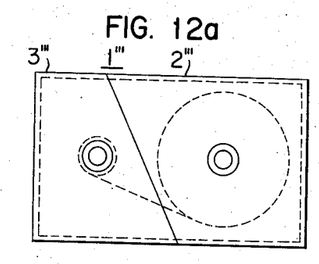
Figure 12B:
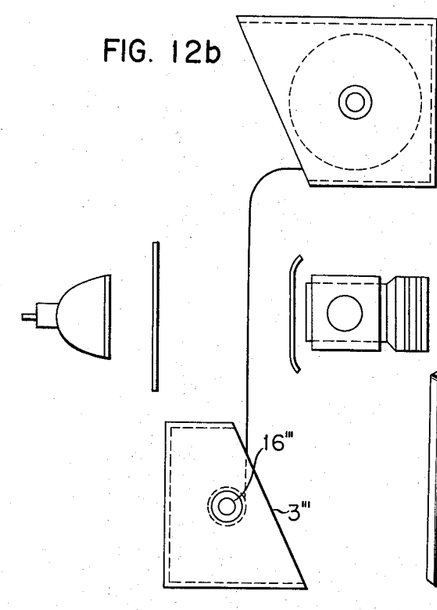

Although the cartridge 1 shown in FIG. 1 is divided in two along a line perpendicular to the direction of the vertical movement of the take-up core 16, it will be readily understood that a cartridge may be divided in two otherwise. For instance, a cartridge 1″ shown in FIGS. 11a and 11b is divided into two units 2″ and 3″ along a line parallel to a direction of the travel of a take-up core 16″ and a cartridge 1‴ shown in FIGS. 12a and 12b is divided into two units 2‴ and 3‴ along a line inclined at a predetermined angle to the direction of the travel of a take-up core 16‴. As will be apparent from FIGS. 11b and 12b, in all cases, a film accommodated in the cartridge can be placed in the film path of the projector in the same manner as that described with regard to FIGS. 7–9.

The various means necessary to embody the invention will now be described hereinafter. For convenience of illustration, it is assumed that the cartridge is of the type described in conjunction with FIGS. 1–6.

Figure 13:
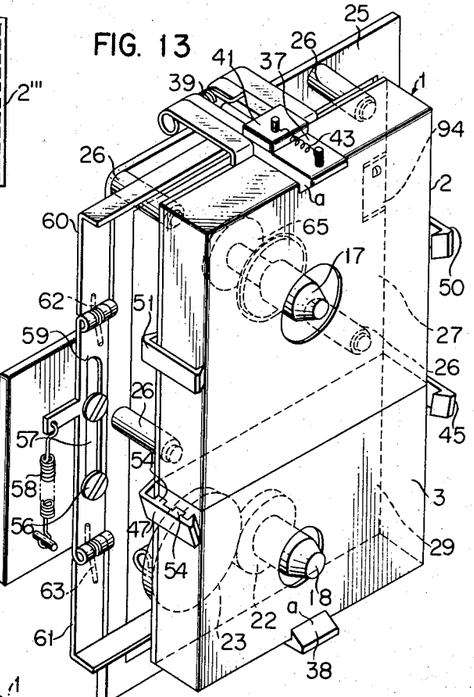
FIGS. 13 and 14 are perspective views illustrating a cartridge holding mechanism.
Figure 14:
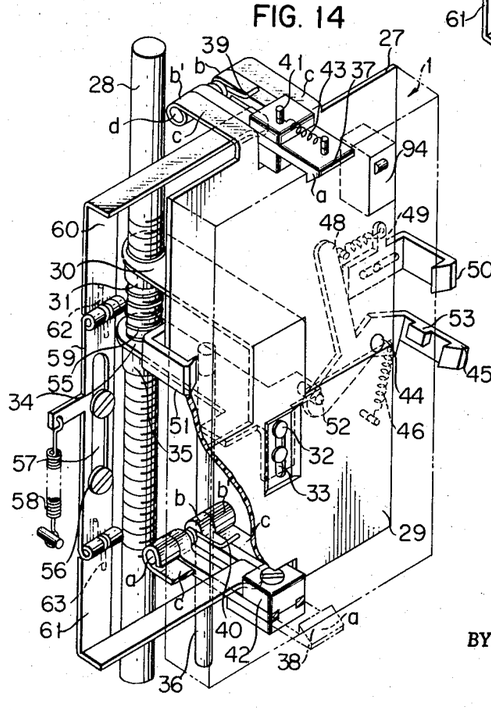
Figures 15, 17:
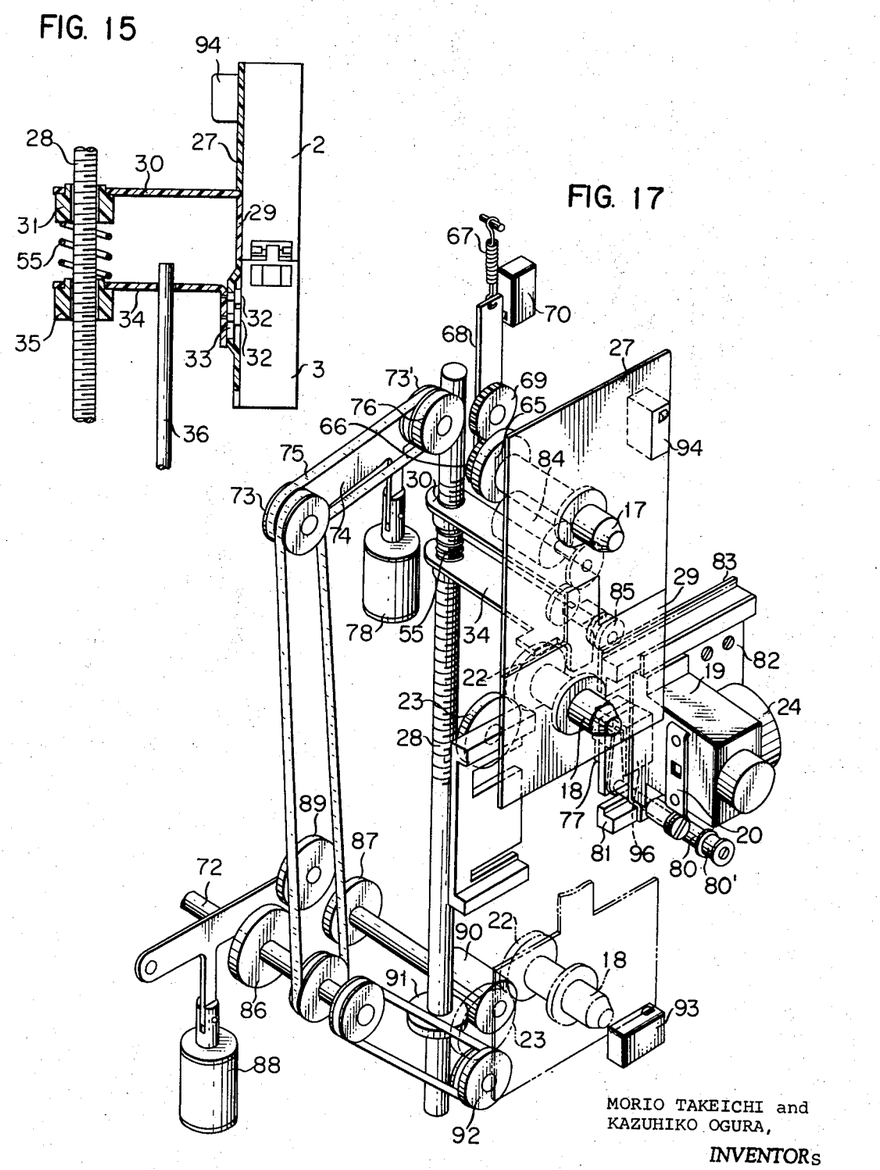
FIG. 15 is a sectional view of a cartridge transferring mechanism.
FIG. 17 is a schematic perspective view of a driving mechanism of the motion-picture projector.

Referring to FIGS. 13–15, on a wall portion 25 of the housing of the projector, a stationary holding plate 27 for holding the supporting unit 2 of the cartridge 1 is mounted by studs 26. The holding plate 27 is arranged in end-to-end relation with a movable plate 29 for supporting the detachable unit 3, when the support and detachable units 2 and 3 are assembled. The movable plate 29 is carried by a threaded rod 28 (see FIG. 14) capable of moving the detachable unit 3 upwardly and downwardly. As best shown in FIG. 15, the movable plate 29 is provided at its upper end portion with an arm 30 bending towards the threaded rod 28. The arm 30 has at its end portion remote from the movable plate 29 a hole into which a guide boss 31 without an internal thread is fixedly fitted in any suitable manner. Further, the movable plate 29 is provided at a portion immediately below the arm 30 with a similar arm 34 slidably connected thereto by connecting means consisting of pins 32 and a slit 33 receiving the pins. The arm 34 similarly has at its end portion remote from the pin and slit assembly 32, 33 a through hole into which a boss 35 with an internal thread is fixedly fitted in any suitable manner. The threaded rod 28 extends through the bosses 31 and 35 and the latter boss 35 is screw thread fitted to the rod 28, so that upon rotation of the threaded rod 28 the arm 34 moves either downwards or upwards. A rod means is shown inserted into the arm 34 for preventing the latter and the plate 29 from rotating due to the rotation of the threaded rod 28. The rod 36 is securely fitted to a suitable stationary member (not shown) such as the housing of the projector.

As best shown in FIG. 14, the stationary and movable plates 27 and 29 carry respectively cartridge grasping members 37 and 38 disposed on the upper and lower edge portions thereof so that they can be turned. The cartridge grasping members 37 and 38 form a first grasping means. Each of the grasping members 37 and 38 has at one end a claw *a* engageable with the cartridge and at the other two-forked end curls *b*. Further, each of the stationary and movable plates 27 and 29 is provided with laterally spaced members *c* bending away from the cartridge and having curled portions *b'* corresponding in shape and size to the curl *b*. In the associated spaces between the members *c*, the said cartridge grasping members 37 and 38 are disposed. It will be understood that each of the grasping members 37 and 38 is rotatable about a pin *d* inserted into the curls *b* and *b'*. On the pins *d*, there are mounted torsionally acting springs 39 and 40 respectively which tend to normally urge the grasping members 37 and 38 to be rotated clockwise and counterclockwise respectively, whereby the cartridge 1 can be restricted in its vertical movement by the opposite claws *a*. On the opposite faces of each of the grasping members 37 and 38, there are provided a pair of movable chips connected together by suitable means such as a screw, forming movable chip assemblies 41 and 42. Such two-piece assembly is adapted to be normally urged towards the tip of the claw *a* by the action of a spring 43 and can slide along a slit in the bifurcated end of the grasping member against or by the resilience of the spring 43.

On the movable plate 29, there is pivotally mounted a cartridge grasping member 45 turnable about a pin 44. The grasping member 45 is provided at its extremity with a claw, similar to the claw *a*, for holding the side of the cartridge and normally urged by a spring 46 in a direction such that the cartridge 1 is released from the grasping member 45. On the movable plate 29, there is pivotally mounted a similar cartridge grasping member 47 which is arranged in symmetric relationship with the grasping member 45 and corresponds in construction and function to the grasping member 45, and the grasping members 45 and 47 form a second cartridge grasping means. Each of the grasping members 45 and 47 for holding the opposite sides of the cartridge has an extension or upwardly extending portion 48 which is formed as being an integral part of the grasping member. On the stationary plate 27, there are mounted for sliding movement a pair of cartridge grasping members 50 and 51 forming a third cartridge grasping means and each of which is loaded by a spring 49 tending to engage the grasping members 50 and 51 forming a third cartridge grasping means and each of which is loaded by a spring 49 tending to engage the grasping members 50 and 51 with the cartridge. However, the grasping members 50 and 51 are pushed out of engagement with the cartridge by the extensions 48 of the grasping members 45 and 47 respectively, because each of the grasping members 45 and 47 is loaded by a spring 46 tending to release the cartridge from the associated grasping member. In addition, each of the grasping members 45 and 47 is provided at the extremity of another extension with a pin 52 and this pin 52 is adapted to be engageable with a larger width portion of the arm 34 as indicated in FIG. 14. The grasping members 45 and 47 have respectively lugs 53 and 54 capable of contacting the hook members 7 and 10 of the connecting means 4 and 5 for releasing the engagement between them. A spring 55 slidably encircling the rod 28 is interposed between the guide boss 31 attached to the arm 30 and the threaded boss 35 attached to the arm 34.

The operation of the movable plate 29 will now be described hereinafter.

It is assumed that upon counterclockwise rotation of the threaded rod 28 the threaded boss 35 moves downwards. In the early part of the counterclockwise rotation of the rod 28, since the arm 34 is in the pin slit connection with the movable plate 29, the arm 34 alone is moved downwards insofar as any clearance exists between the lower pin 32 and the lower end of the slit 33. During such early part of the counterclockwise rotation of the rod 28, therefore, the arm 30 and the movable plate 29 are held in the original position by the resilience of the spring 55. However, the wider portion of the arm 34 causes the grasping members 45 and 47 to be turned respectively in the counterclockwise and clockwise direction while at the same time allowing the grasping members 50 and 51 to move inwardly due to the resilience of the spring 49, whereby the cartridge 1 is held by the grasping members 45, 47, 50 and 51. On the completion of the early part of the counterclockwise rotation of the rod 28, the movable plate 29 is ready for the beginning of the downward movement because there is no longer any clearance between the lower pin 32 and the lower end of the slit 33. When it is desired to transfer the movable plate 29 upwards from a lowermost position or projection position, the rod 28 is reversed, i.e., rotated clockwise, whereby the movable plate 29 is raised through the arm 34 while the distance between the arms 30 and 34 remains unchanged by the spring 55. When the upper edge of the movable plate 29 is pushed against the lower edge of the stationary plate 27, the arm 30 is not allowed to move upwards but the arm 34 further moves upwards while compressing the spring 55, with the result that the distance between the arms 30 and 34 decreases. This causes the wider portion of the arm 34 not to engage under pressure the pins 52 on the grasping members 45 and 47, with the result that these grasping members 45, 47, 50 and 51 are turned back to the respective positions in which the cartridge 1 is released from all of the grasping members.

The operation of the first cartridge grasping means 37, 38 will be described hereinafter in conjunction with FIGS. 16a–16d.

Figures 16A, 16B, 18:
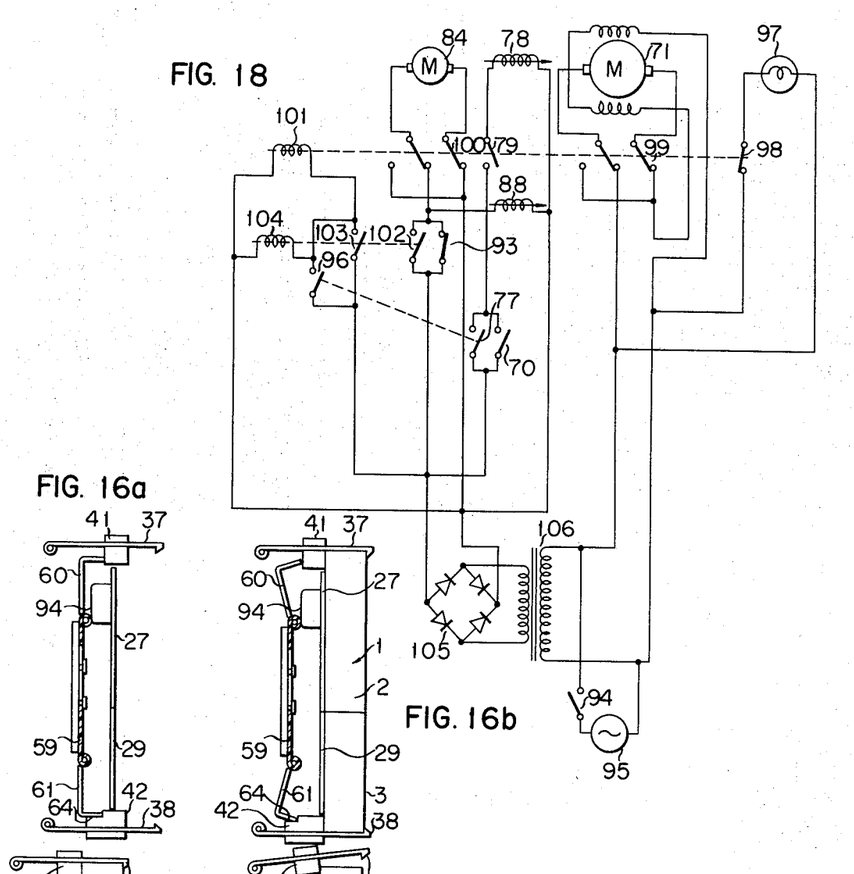
FIGS. 16a-16d are diagrammatic views for explaining the operation of the cartridge holding mechanism.
FIG. 18 is a circuit diagram of the projector.

As shown in FIGS. 14 and 16a and previously stated, the grasping members 37 and 38 are loaded respectively by the springs 39 and 40 tending to rotate the members 37 and 38 in the direction to hold the cartridge and are normally held horizontal. On the housing of the projector, a slide plate 59 is mounted by pins 56 in a vertically slidable manner. The slide plate 59 can slide along a slit 57 and is pulled downwardly by a spring 58 having a relatively low strength. The slide plate 59 is provided at the opposite upper and lower ends with curled portions, to which L-shaped plates 60 and 61 are pivotally connected, respectively. The respective tips of the rotatable plates 60 and 61 are adapted to be held in vertical condition, i.e., in alignment with the slide plate 59 by the resilience of torsionally acting springs 62 and 63, if no force is applied to the rotatable plates 60 and 61. Also, when the projector is not loaded with the cartridge, the slide plate 59 is normally forced upwardly by a stepped portion 64 of the movable chip assembly 42.

As shown in FIG. 16b, in loading the projector with the cartridge, the back of the cartridge 1 is pushed against the movable chip assemblies 41 and 42, causing the rotatable plates 60 and 61 to be respectively rotated in the counterclockwise and clockwise directions.

Figures 16C, 16D:
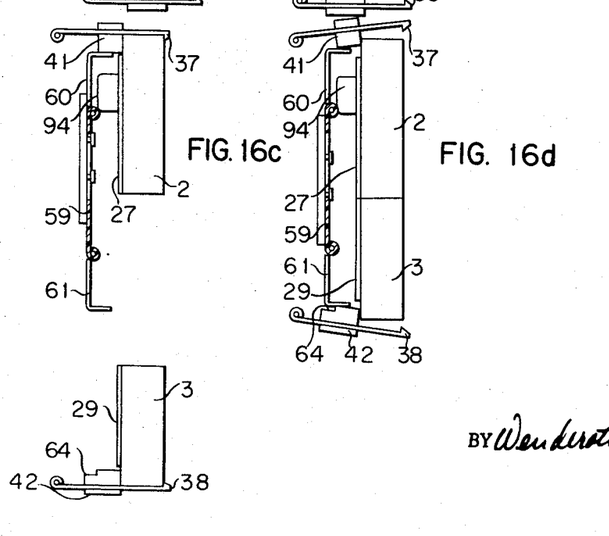

As described in conjunction with FIGS. 13–15, by bringing the connecting means 4 and 5 (see FIG. 1) out of engagement, the detachable unit 3 of the cartridge 1 is allowed to move downwards together with the movable plate 29. The descending movement of the movable plate 29 is accompanied by the corresponding movement of the lower cartridge grasping member 38. This allows the slide plate 59 to move downwards along the slit 57, and consequently the upper rotatable plate 60 descends to a position under the upper movable assembly 41 as shown in FIG. 16C. At this time, both the rotatable plates 60 and 61 are in alignment with the slide plate 59. Under such conditions, the projection of the film can be effected. After the projection is accomplished, the threaded rod 28 (see FIGS. 14 and 15) will be reversed to effect the ascending movement of the detachable unit 3 and the movable plate 29 in such a manner as will be described hereinafter.

On the ascending movement of the movable plate 29, the lower movable chip assembly 42 is pushed against the lower surface of the flanged portion of the rotatable plate 61, whereby the slide plate 59 is forced up. At this time, the flanged portion of the rotatable plate 60 comes in contact with the lower surface of the movable chip assembly 41. Therefore, where the movable plate 29 has reached the position in which its upper edge engages the lower edge of the stationary plate 27, the first cartridge grasping means 37, 38 are opened as shown in FIG. 16d. In addition, as has been described in conjunction with FIGS. 13–15, all of the second and third cartridge grasping members 45 and 47, 50 and 51 are out of engagement, so that the cartridge 1 can be detached from the stationary and movable plates 27 and 29 with ease.

In addition, after the detachment of the cartridge 1, the movable chip assemblies 41 and 42 are brought into the respective positions shown in FIG. 16a by the action of the springs 43 (see FIGS. 13 and 14), respectively.

The driving mechanism and the electrical control system of the projector will now be described in conjunction with FIGS. 17 and 18.

The film supply spindle 17 extending through the stationary plate 27 is adapted to operatively associate with the support reel 15 held in the supply unit 2 of the cartridge 1. Mounted at the righthand end of the spindle 17 in coaxial relationship therewith are a friction roller 65 and a gear 66 each of which may be an integral part of the spindle 17. Further, the spindle 17 is provided with a level 68 which is turnable about the spindle 17 and loaded by a spring 67 tending to pull the lever 68 upwardly and vertically. The lever 68 is provided with a gear 69 engaging the gear 66, and when in its vertical position shown in FIG. 17, it renders a switch 70 inoperative or open. When the supply spindle 17 is rotated clockwise, i.e., in a direction in which the film is fed to the detachable unit 3, the lever 68 also rotates clockwise and the switch 70 remains open. In contrast, when the spindle 17 is rotated counterclockwise, i.e., in a film winding direction, the lever 68 also rotates in the same direction and the switch 70 is closed.

The rotational movement of the supply spindle 17 is effected upon engagement of the friction roller 65 with a mating friction roller 76 which is mounted for rotation at the end of a turntable lever 74 and driven through a belt 75 bridging over a pulley 73 and a pulley 73'. The pulley 73' may be an integral part of the friction roller 76. The lever 74 is connected with an electromagnet 78 and is rotatable about the pulley 73 and the pulley 73 is driven through a driving shaft 72 and any suitable driving mechanism by a driving motor 71 (see FIG. 18) of the projector.

The engagement and disengagement of the friction roller 76 with and from the friction roller 65 can be effected by the electromagnet 78 controlled by the switch 70 and a switch 77 electrically connected in parallel with the switch 70. In the circuit of the electromagnet 78, there is provided a relay contact 79 which acts so as to energize the electromagnet 78 only when the film is being rewound on the reel 15. The switch 77 is normally held open because it is depressed by a lever 80 with a tension rollert 80', which lever is pivotally mounted on the projection lens holder 19 (see FIGS. 7–9) and loaded by a spring (not shown) tending to rotate the lever 80 in the clockwise direction.

As best shown in FIG. 17, the projection lens holder 19 is fixedly secured to a mount 82 slidable on a guide 81 having two rails, a part of the guide 81 being removed to enable the take-up spindle 18 mounted for rotation on the movable plate 29 to pass across the rails 81. Securely mounted on the back of the guide 81 in any suitable manner is a rack 83 with which the mounting plate 82 is connected by screw means. The rack 83 is in engagement with a gear 85 driven through suitable friction clutch means (not shown) by an electric motor 84 (see FIG. 18) to enable the projection lens holder 19 with the pressure plate 20 to move along the guide 81. As will be apparent from FIG. 17, the threaded rod 28 is driven through a driving friction roller 86 mounted on the shaft 72 rotated by the motor 71, a driven friction roller 87, a clutch roller 89 operated by an electromagnet 88 in such a manner as being brought into or out of engagement with the friction rollers 86 and 87, a worm 90, and a worm wheel 91 fixedly mounted on the rod 28.

When the movable plate 29 reaches its lowermost position or projection position as indicated in FIG. 17 by a phantom line, the take-up spindle 18 is driven through the friction rollers 22 and 23 by a driving roller 92 which is, in turn, driven through a suitable driving mechanism by the driving shaft 72. In addition, the movable plate 29 in the lowermost position is adapted to depress with its lower edge a switch 93 thereby to open the latter.

On the back of the stationary plate 27, there is provided a switch 94 arranged such that the back of the cartridge 1, when attached to the stationary plate 27, pushes the switch 94 to close it. By the operation of the switch 94, a source of current 95 (see FIG. 18) for the whole circuit of the projector is connected to the circuit.

A switch 96 is disposed near the switch 77 in side by side relation and is normally open, but closed by the lever 80 when the projection of the film has been accomplished, because at that time the lever 80 is rotated in the counterclockwise direction due to an increased tension in the film. Generally designated by the reference numeral 97 (see FIG. 18) is a projection lamp which can be extinguished by changing a contact 98 to the off position. The contact 98 remains closed only during the film rewinding operation. Also, the contact 98 is switched between its open and closed conditions by a relay magnet 101 simultaneously with the switchings of contacts 99 and 100 for reversing the directions of the rotations of the motors 71 and 84, respectively.

In addition, relay contacts 102 and 103 are closed by a relay magnet 104 and the functions of the relay contacts 102 and 103 will be described hereinafter. Further, in FIG. 18, the reference numerals 105 and 106 designate respectively any suitable full-wave rectifier and voltage transformer which are of the conventional construction and need not be further described.

The operation of the motion-picture projector comprising the construction as above described will now be described in conjunction with FIGS. 17 and 18 in particular.

First, the cartridge 1 is rested on the stationary and movable plates 27 and 29 of the projector, as shown in FIGS. 7, 13, 14 and 16b. In such a condition, the cartridge 1 is positioned roughly by the first cartridge grasping means and the film take-up spindle 18, and the film supply spindle 17 positions the supply reel 15 (FIG. 1). When the switch 94 is depressed by the back of the cartridge 1, the current from source 95 is supplied and accordingly the motors 71 and 84 start to rotate and the projection lamp 97 is switched on. At the same time, the electromagnet 88 is excited to bring the clutch roller 89 into engagement with the friction rollers 86 and 87, whereby the threaded rod 28 rotates counterclockwise. In the early part of the rotation of the rod 28, the arm 34 alone moves downwards the predetermined distance to ensure that the cartridge 1 is firmly held by the second and third grasping means while at the same time the connecting means 4 and 5 for connecting the support unit 2 with the detachable unit 3 are brought out of engagement by the lugs 53 and 54 provided on the grasping members 45 and 47. Upon further rotation of the rod 28 after the clearance between the pin 32 attached to arm 34 and the slit 33 in the movable plate 29 no longer exists, the movable plate 29 moves downwards while holding the detachable unit 3. At this time, the detachable unit 3 is moved downwards with the film take-up core 16, so that the leading end of the film can pass through the film gate or the spacing between the pressure plate 20 and the aperture plate 21. During the time the detachable unit 3 travels to its lowermost position at which the friction roller 23 comes in frictional engagement with the driving roller 92, the projection lens holder 19 together with the pressure plate 20 moves towards the aperture plate 21, and before the movable plate 29 reaches the lowermost position, the film gate necessary for the projection is closed. Under such conditions, the switch 93 is held open by the lower edge of the movable plate 29, so that the electromagnet 88 is deenergized and the motor 84 stops rotating. Due to the deenergization of the electromagne 88, the clutch roller 89 is brought out of engagement with the friction rollers 86 and 87, thus causing the stopping of rotation of the threaded rod 28. Therefore, the movable plate 29 can be held in the aforementioned lowermost position and the projection lens holder 19 is also held in its projection position (see FIGS. 9 and 16c). The film accommodated in the support unit 2 can be projected on the screen while being wound on the film take-up core 16 fitted onto the take-up spindle 18 rotated by the driving roller 92.

Upon the completion of the projection of the overall length of the film accommodated in the support unit 2, the tension in the film increases because the trailing end of the film is fixedly secured to the supply reel 15. This causes the lever 80 with the tension roller 80' to be rotated in the counterclockwise direction to a position as is shown in FIG. 9 so that the side by side switches 77 and 96 are closed. As the result, the relay magnet 104 is energized and closes the relay contacts 102 and 103. Thus, the relay magnet 104 is self-excited and the relay magnet 101 is also energized. Upon the energization of the relay magnet 101, the contacts 99 and 100 are switched to cause the motors 71 and 84 to be reversed, with the result that the contact 79 of the electromagnet 78 is closed and the contact 98 for the projection lamp 97 opens. Thus, he motor 71 is rotated in the film rewinding direction and the motor 84 in such a direction as to cause the lens holder 19 to be moved to open the film gate. Because of the simultaneous energization of the electromagnets 88 and 78, the threaded rod 28 is rotated in the clockwise direction to cause the movable plate 29 to be moved upwards while at the same time the friction roller 76 comes into frictional engagement with the friction roller 65 mounted on the supply spindle 17, causing the reel 15 fitted onto the spindle 17 to operate to rewind the film thereon from the take-up core 16 In addition, when the film supply spindle 17 is rotated in the film rewinding direction, since the lever 68 is provided with the gear 69 engaging the gear 66 which rotates with the spindle 17, the lever 68 is subjected to a force tending to rotate the lever 68 in the counterclockwise direction against the resilience of the spring 67, whereby the lever 68 moves away from the switch 70, closing the switch 70. Therefore, it will be understood that the electromagnet 78 continues to be energized to successively rewind the film even though the operation of the switch 77, which is expected to be closed by the tension roller lever 80, is not to be relied upon and even though the film tension is not applied to the tension roller lever 80 for the reason such, for example, as that the projection lens holder 19 is moved away from the aperture plate 21, i.e., in a direction in which a beam of light emanating from the projection lamp 97 travels.

Upon completion of the film rewinding, the film supply and take-up spindles 17 and 18 are prevented from rotating even though they are energized by the motor 71, because the leading end of the film is securely fixed to the take-up core 16. This causes the lever 68 not to be subjected to the force tending to rotate the lever 68 counterclockwise. Therefore, the lever 68 is moved back to the neutral position, as shown in FIG. 17, by the resilience of the spring 67 to open the switch 70. At this time, the projection lens holder 19 has moved to the forward position and the switch 77 has already been closed due to the tension roller lever 80, so that the electromagnet 78 is deenergized to cause the friction roller 76 associated with the electromagnet 78 to be disengaged from the friction roller 65, resulting in the completion of driving of the film supply spindle 17.

In the meantime, the movable plate 29 continues to move upwardly. At this time, the electromagnet 88 is energized because the contacts 102 and 103 are still closed due to the self-excitation of the relay magnet 104, so that the threaded rod 28 continues to rotate in the clockwise direction and the motor 84 in the direction in which the beam of light emanating from the projection lamp 97 travels.

When the upper edge of the ascending movable plate 29 comes in contact with the lower edge of the stationary plate 27, the movable chip assembly 42 mounted on the movable plate 29 is pushed against the flanged plate 61 to move the slide plate 59 as well as the upper flanged plate 60 upwardly, whereupon the first cartridge grasping means 37, 38 are brought out of engagement as shown in FIG. 16d. However, as the support and detachable units 2 and 3 of the cartridge are held respectively by the second and third grasping means 45 and 47, 50 and 51, the switch 94 remains closed. This allows the threaded rod 28 to further rotate in the clockwise direction and therefore the arm 34 is caused to move upwards by the predetermined distance while compressing the spring 55. In the meantime, by the wider portion of the arm 34, all of the second and third grasping means 45 and 47, 50 and 51 are brought out of engagement, and the support and detachable units 2 and 3 are connected together by the connecting means 4 and 5. The cartridge 1 is pushed away from the stationary and movable plates 27 and 29 by the movable chip assemblies 41 and 42 (see FIG. 16d), whereby the switch 94 is opened. As a result, the motor 71 is deenergized and the electromagnet 88 is deenergized and the rotation of the threaded rod 28 is stopped and each of the relay magnets 101 and 104 is restored in its original inoperative state.

While the construction and operation of the projector embodying the invention have been described in conjunction with the type of projector employing the cartridge shown in FIGS. 1–6, it will be readily understood by those skilled in the art that any of the cartridges as illustrated in FIGS. 10a, 10b, 11a, 11b, 12a and 12b can be employed by modifying the projector without departing from the spirit and scope of the invention.

When employing the cartridge 1' ilustrated in FIGS. 10a and 10b, the take-up core 16' is the only part to be moved, so that there is no need to provide means such as the movable plate 29, the cartridge grasping members mounted on the movable plate 29, and means for bringing the cartridge grasping members into and out of engagement. This means that only a small amount of movement of the projection lens holder is required for the passage of the take-up core 16'.

From the foregoing, it will be readily understood that, according to the invention, the cartridge includes the film supply reel carried for rotation by the support means, and the film take-up core engageable, when the cartridge is not in use, with the said support means and disengageable, when it is in use, i.e., when threading the film, from the said support means to be driven by the take-up spindle of the projector, so that when taking custody of the cartridge, it can be handled as a single article and when loading the projector with such a cartridge, a reliable film threading operation can be effected.

This invention has been described with particular reference to a preferred embodiment thereof, but it should be understood that the invention includes all modifications and equivalents which fall within the scope of the appended claims. For example, it should be considered that the invention includes within its scope a projector in which the aperture plate is mounted on the projection lens lamp side. In this case, it will be apparent that only the side while the pressure plate is mounted on the projection pressure plate is moved away from the aperture plate by a distance sufficient to allow the take-up core to pass through therebetween.

What we claim is:

1. In a motion-picture projector for projecting film in a cartridge having a film supply reel on which a roll of motion picture film is wound with its trailing end secured thereto, a support means for carrying said film supply reel in a rotatable manner, and a film take-up core to which a leading end of said film roll is secured, said take-up core being detachable from said support means; the combination comprising, (a) means for holding said support means, said holding means including a stationary plate having a mounting surface for said support means, and at least first grasping means for holding said support means on the mounting surface of said stationary plate, (b) a supply reel spindle extending through said stationary plate and engageable with said film supply reel, (c) a supply reel spindle driving means operatively engageable with said supply reel spindle for driving the latter in a film rewinding direction, (d) means for effecting an operating engagement of said supply reel spindle with said supply reel spindle driving means, (e) a take-up core spindle engageable with said take-up core, (f) a take-up core spindle driving means, (g) take-up core and take-up core spindle moving means coupled to said take-up core and take-up core spindle for moving them away from said support means and bringing said take-up core spindle into engagement with said take-up core spindle driving means, (h) an electric motor coupled to said supply reel spindle driving means and said take-up core spindle driving means for driving the respective driving means, (i) a film gate, and (j) means coupled to said film gate for moving said film gate to open the later a distance sufficient to permit said take-up core to pass through said film gate and closing said film gate when said take-up core spindle is brought into engagement with said take-up core spindle driving means.

2. The combination as claimed in claim 1, wherein said means for holding said support means further comprises a movable plate movable away from said stationary plate, and second grasping means mounted on said movable plate for grasping said cartridge to disengage said take-up core from said support means, said movable plate having said take-up core spindle rotatably mounted thereon.

3. The combination as claimed in claim 2, wherein said take-up core and take-up core spindle moving means includes a threaded rod means, and said movable plate includes a first arm member having an unthreaded aperture therethrough, and a second arm member having an internally threaded aperture therein and slidably mounted on said movable plate for movement within a predetermined limit relative to said first arm member, said first and second arm members having a spring interposed therebetween, said threaded rod means extending through the apertures in said first and second arm members and being threadedly engaged with said first arm member.

4. The combination as claimed in claim 2, wherein a resilient member is provided which is coupled to each of said first grasping means for holding said support means for loading said first grasping means for tending to bring said means for holding said support means into engagement with said support means and said means for holding said support means further comprises movable members each having a further resilient member coupled thereto tending to move the movable member into engagement with said support means and take-up reel to move said support means and take-up reel out of engagement with said stationary and movable plates, a slide plate slidable on said means for holding said support means having a still further resilient member coupled thereto for biasing said slide plate upwards, and a pair of rotatable plates mounted for pivotal motion respectively on the upper and lower end portions of said slide plate, each of said rotatable plates having another resilient member coupled thereto and biasing said rotatable plates to bring the rotatable plates into contact with the backs of the respective movable members.

5. In a motion-picture projector for projecting a film in a cartridge having a film supply reel on which a roll of motion-picture film is wound with its trailing end secured thereto, a support unit for carrying said film supply reel in a rotatable manner, a film take-up core to which a leading end of said film roll is secured, and a detachable unit for carrying said take-up core in a rotatable manner, said detachable unit being detachable from said support unit; the combination comprising, (a) means for holding said cartridge, said holding means comprising (1) a stationary plate having means for supporting said film supply reel, and a movable plate, said stationary and said movable plates defining a mounting surface for said cartridge,
(2) first cartridge grasping means consisting of a pair of claw members pivotally mounted respectively on said stationary and movable plates to hold said support and detachable units of said cartridge, and
(3) second cartridge grasping means consisting of a pair of claw members pivotally mounted respectively on said movable plate to hold opposite sides of said cartridge, said claw members being provided respectively with means for breaking the engagement of said detachable unit with said supporting unit,
(b) driving means for film winding,
(c) plate moving means coupled to said movable plate for moving said movable plate, said detachable unit and said take-up core to bring said take-up core into and out of driving engagement with said driving means,
(d) a film gate, and
(e) film gate moving means coupled to said film gate for moving said film gate to open it a distance sufficient to permit said take-up core to pass through said film gate and for closing said film gate when said take-up core is brought into engagement with said driving means.

6. The combination as claimed in claim 5, wherein said plate moving means for moving said movable plate, said detachable unit and said take-up core includes a threaded rod, and said movable plate includes a first arm member having an unthreaded aperture therethrough, and a second arm member having an internally threaded aperture therein and slidably mounted on said movable plate for movement within a predetermined limit relative to said first arm member, said first and second arm members having a spring interposed therebetween, said threaded rod extending through the apertures in said first and second arm members and being threadedly engaged with said first arm member.

7. The combination as claimed in claim 5 wherein a resilient member is provided and coupled to each of said first cartridge grasping members for tending to bring the first cartridge grasping members into engagement with said cartridge, and said means for holding said cartridge further comprises a movable member associated with each of said stationary and movable plates, each movable member having a further resilient member coupled thereto tending to move the movable member into engagement with said support unit and said take-up core to move said support unit and said take-up core out of engagement with said stationary and movable plates, a slide plate slidable on said means for holding said cartridge having a still further resilient member coupled thereto for biasing said slide plate upwards, and a pair of rotatable plates mounted for pivotal motion respectively on the upper and lower end portions of said slide plate, each of said rotatable plates having another resilient member coupled thereto and biasing said rotatable plates to bring the rotatable plates into contact with the backs of the respective movable members.

References Cited
UNITED STATES PATENTS 3,443,501   5/1969   Domnick __________ 95—31 R SAMUEL S. MATTHEWS, Primary Examiner R. L. MOSES, Assistant Examiner U.S. Cl. X.R.

95—31 R; 352—158